United States Patent
Ishitoko et al.

(10) Patent No.: US 6,668,649 B2
(45) Date of Patent: Dec. 30, 2003

(54) VIBRATOR FOR A VIBRATING GYROSCOPE, VIBRATING GYROSCOPE USING THE VIBRATOR, AND ELECTRONIC APPARATUS USING THE VIBRATING GYROSCOPE

(75) Inventors: Nobuyuki Ishitoko, Moriyama (JP); Masato Koike, Nakaniikawa-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/882,456

(22) Filed: Jun. 14, 2001

(65) Prior Publication Data

US 2002/0020218 A1 Feb. 21, 2002

(30) Foreign Application Priority Data

Jun. 16, 2000 (JP) ........................................ 2000-181236

(51) Int. Cl.$^7$ ............................................... G01C 19/00
(52) U.S. Cl. .................................................... 73/504.12
(58) Field of Search ........................ 73/504.02, 504.03, 73/504.04, 504.12, 504.14, 514.34

(56) References Cited

FOREIGN PATENT DOCUMENTS

| JP | 5141978 | 6/1993 |
| JP | 11351875 | 12/1999 |

*Primary Examiner*—Richard A. Moller
(74) *Attorney, Agent, or Firm*—Keating & Bennett, LLP

(57) ABSTRACT

In order to provide a vibrating gyroscope in which variations in the angular-velocity detection sensitivity are not likely to occur even when sharp temperature changes occur, a vibrator for a vibrating gyroscope includes, on one main surface, a first detection electrode and a second detection electrode, which output a signal containing an angular-velocity signal, wherein a groove having a predetermined depth is provided between the first detection electrode and the second detection electrode. As for a vibrator for a vibrating gyroscope of the present invention, since the difference between the resonance frequency and the anti-resonance frequency in a bending vibration mode in the driving direction becomes closer to the difference between the resonance frequency and the anti-resonance frequency in a bending vibration mode in the detection direction, variations in the angular-velocity detection sensitivity are not likely to occur even when sharp temperature changes are given.

28 Claims, 13 Drawing Sheets

VIBRATOR FOR A VIBRATING GYROSCOPE, VIBRATING GYROSCOPE USING THE VIBRATOR, AND ELECTRONIC APPARATUS USING THE VIBRATING GYROSCOPE

BACKGROUND OF THE INVENTION

1. Field of the Invention

The present invention relates to a vibrator for a vibrating gyroscope, a vibrating gyroscope using the vibrator, and an electronic apparatus using the vibrating gyroscope. More particularly, the present invention relates to a vibrator for a vibrating gyroscope for use in video cameras with a camera-shake prevention function, car navigation systems, pointing devices, etc., a vibrating gyroscope using the vibrator, and an electronic apparatus using the vibrating gyroscope.

2. Description of the Related Art

FIG. 20 shows a perspective view of a conventional vibrator 100 for a vibrating gyroscope. FIG. 21 shows a front view thereof. The basic concept behind the vibrator 100, shown in FIGS. 20 and 21, is disclosed in Japanese Unexamined Patent Application Publication No. 7-332988.

In FIGS. 20 and 21, the vibrator 100 has a first piezoelectric body 101 which is polarized in the thickness direction and has a first detection electrode 104a and a second detection electrode 104b, both having the same area, formed on one main surface thereof. The vibrator 100 also includes a second piezoelectric body 102 which is polarized in the thickness direction and has a driving electrode 105a formed on one main surface thereof. The other main surface of the first piezoelectric body 101 and the other main surface of the second piezoelectric body 102 are laminated together with an intermediate electrode 103 in between.

Furthermore, supporting members 106a and 106b which also serve the function of lead wires are provided at the positions at which node points N1 and N2, which are the nodes of vibration of the vibrator 100, are projected vertically on the first detection electrode 104a and the second detection electrode 104b, and supporting members 106c and 106d which also serve the function of lead wires are provided at the positions at which node points N1 and N2 are projected vertically on the driving electrode 105a.

Since the end portions of the supporting members 106a, 106b, 106c, and 106d are fixed and a driving signal is applied to the driving electrode 105a via the supporting members 106c and 106d, the vibrator 100 performs a bending vibration in the thickness direction in which both longitudinal ends are free, and in which the nodes of the lowest-order mode are node points N1 and N2. Then, when an angular velocity about an axis in the longitudinal direction is applied to the vibrator 100, the vibrator bends in the width direction, and a signal containing an angular velocity signal is output from the first detection electrode 104a and the second detection electrode 104b. In the following description, the vibration in the thickness direction is called "longitudinal bending vibration", and the vibration in the width direction is called "transverse bending vibration".

Generally, when there are variations in the characteristics of the vibration of the vibrator for a vibrating gyroscope, or the vibration of the vibrator for a vibrating gyroscope is not stable, it is difficult to accurately detect the angular velocity. Also, as for the vibrator for a vibrating gyroscope, as a result of being affected by the external environment during manufacture or during use, the vibration characteristics may change.

The conventional vibrator for a vibrating gyroscope 100 does not particularly have a means for reducing variations in vibration characteristics or a means for stabilizing the vibration, presenting a problem in that vibration characteristics may change under the influence of the external environment due to processing variations, variations in vibration characteristics occur, or the vibration of the vibrator for a vibrating gyroscope becomes unstable.

Also, a vibrating gyroscope using the vibrator for a vibrating gyroscope 100 has the problem of being incapable of accurately detecting angular velocity because the vibration of the vibrator for a vibrating gyroscope 100 becomes unstable.

SUMMARY OF THE INVENTION

Accordingly, an object of the present invention is to provide a vibrator for a vibrating gyroscope in which variations in vibration characteristic do not occur and in which vibration is stabilized.

Another object of the present invention is to provide a vibrating gyroscope capable of accurately detecting angular velocity by using a vibrator for a vibrating gyroscope in which variations in vibration characteristic do not occur and in which the vibration is stable.

Another object of the present invention is to provide an electronic apparatus capable of performing precise control of angular-velocity by using a vibrating gyroscope capable of accurately detecting angular velocity.

The vibrator for a vibrating gyroscope comprises a piezoelectric vibratable body and a first detection electrode and a second detection electrode formed on the piezoelectric body, for outputting a signal containing an angular velocity. At least one groove having a predetermined depth is provided in the piezoelectric vibrating body between the first detection electrode and the second detection electrode.

The piezoelectric vibrating body may comprise: an intermediate electrode; first and second piezoelectric bodies, each having first and second main surface, the first and second piezoelectric bodies being laminated via the intermediate electrode such that the first main surfaces of the first and second piezoelectric bodies are bonded to opposite sides of the intermediate electrode, respectively; and a driving electrode provided on the second main surface of the second piezoelectric body. The first and second detection electrodes are provided on the second main surface of the first piezoelectric body. The groove is provided on the second main surface of the first piezoelectric body along a longitudinal center line of the second main surface of the first piezoelectric body.

In the vibrator for a vibrating gyroscope of the present invention, the groove is preferably symmetrical with respect to the width direction of the first piezoelectric body.

In the vibrator for a vibrating gyroscope of the present invention, the bottom portion of the groove is preferably parallel to one main surface of the first piezoelectric body.

In the vibrator for a vibrating gyroscope of the present invention, the depth of the groove is preferably more than or is equal to 10% of the thickness of the first piezoelectric body.

In the vibrator for a vibrating gyroscope of the present invention, the depth of the groove is preferably 60% to 80% of the thickness of the first piezoelectric body.

According to another aspect, the present invention provides a vibrator for a vibrating gyroscope comprising driving means for driving the vibrator for a vibrating gyroscope, and detection means for detecting the output generated from the vibrator for a vibrating gyroscope.

According to another aspect, the present invention provides an electronic apparatus using the vibrating gyroscope.

In this manner, in the vibrator for a vibrating gyroscope of the present invention, since a groove is provided between the first detection electrode and the second detection electrode, vibration becomes stable.

In the vibrator for a vibrating gyroscope of the present invention, even when sharp temperature changes are given, variations in the angular-velocity detection sensitivity are not likely to occur.

In the vibrator for a vibrating gyroscope of the present invention, since a groove is provided between the first detection electrode and the second detection electrode, the difference between the capacitance of the first detection electrode and the capacitance of the second detection electrode is small, and stability with respect to changes in temperature is improved.

In the vibrator for a vibrating gyroscope of the present invention, since a groove is provided between the first detection electrode and the second detection electrode, and the provided groove is symmetrical with respect to the width direction of the first piezoelectric body, the difference between the capacitance of the first detection electrode and the capacitance of the second detection electrode is very small, and stability with respect to changes in temperature is improved.

In the vibrator for a vibrating gyroscope of the present invention, since the depth of the groove is a predetermined depth, the difference in the resonance frequencies of the longitudinal and transverse bending vibrations is nearly a constant value, and variations in the angular-velocity detection sensitivity are not likely to occur.

In the vibrator for a vibrating gyroscope of the present invention, since a vibrator for a vibrating gyroscope, in which variations in the angular-velocity detection sensitivity are not likely to occur, is used, the sensitivity of the vibrator can be set to be high, with the result that a detection circuit can be formed using an amplification circuit having a small amplification ratio, thereby reducing cost.

Furthermore, in the vibrating gyroscope of the present invention, since vibration is stable, and a vibrator for a vibrating gyroscope, in which variations in the angular-velocity detection sensitivity are not likely to occur, is used, it is possible to detect angular velocity with accuracy.

In addition, in the electronic apparatus of the present invention, since a vibrating gyroscope having superior temperature stability and which is capable of accurately detecting angular velocity is used, it is possible to form a precise control mechanism.

The above and further objects, aspects and novel features of the invention will become more fully apparent from the following detailed description when read in conjunction with the accompanying drawings.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

Figure 1:
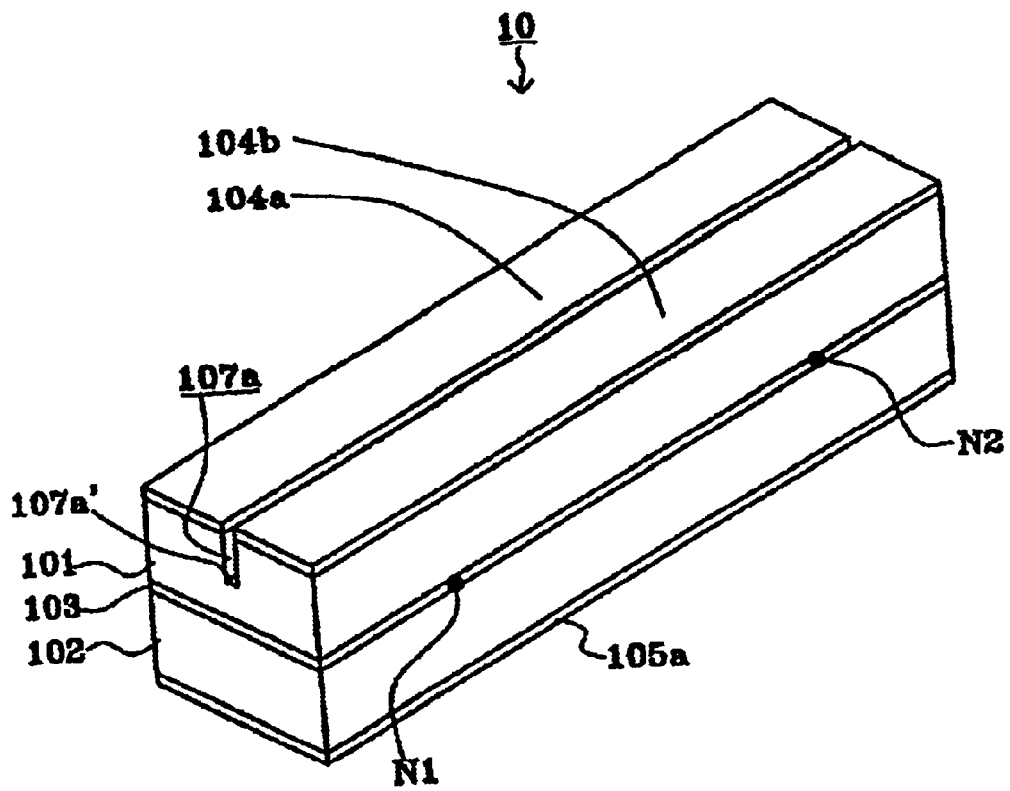
FIG. 1 is a perspective view showing an embodiment of a vibrator for a vibrating gyroscope of the present invention.
Figure 2:
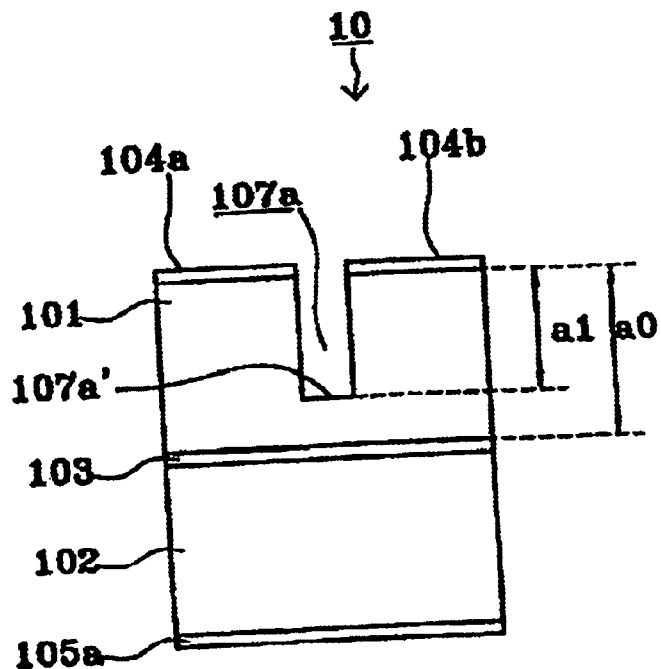
FIG. 2 is a front view of the vibrator for a vibrating gyroscope of FIG. 1.
Figure 20:
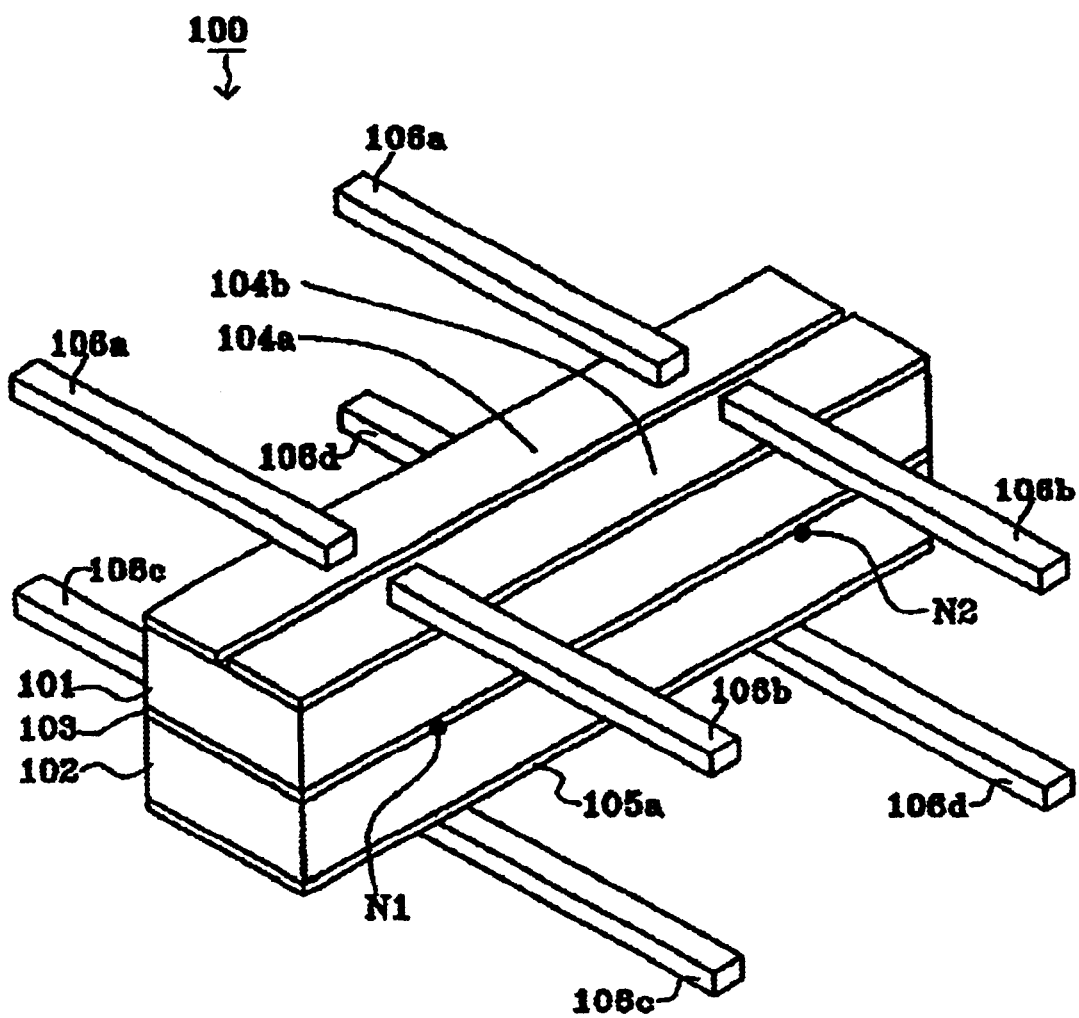
FIG. 20 is a perspective view showing a conventional vibrator for a vibrating gyroscope.
Figure 21:
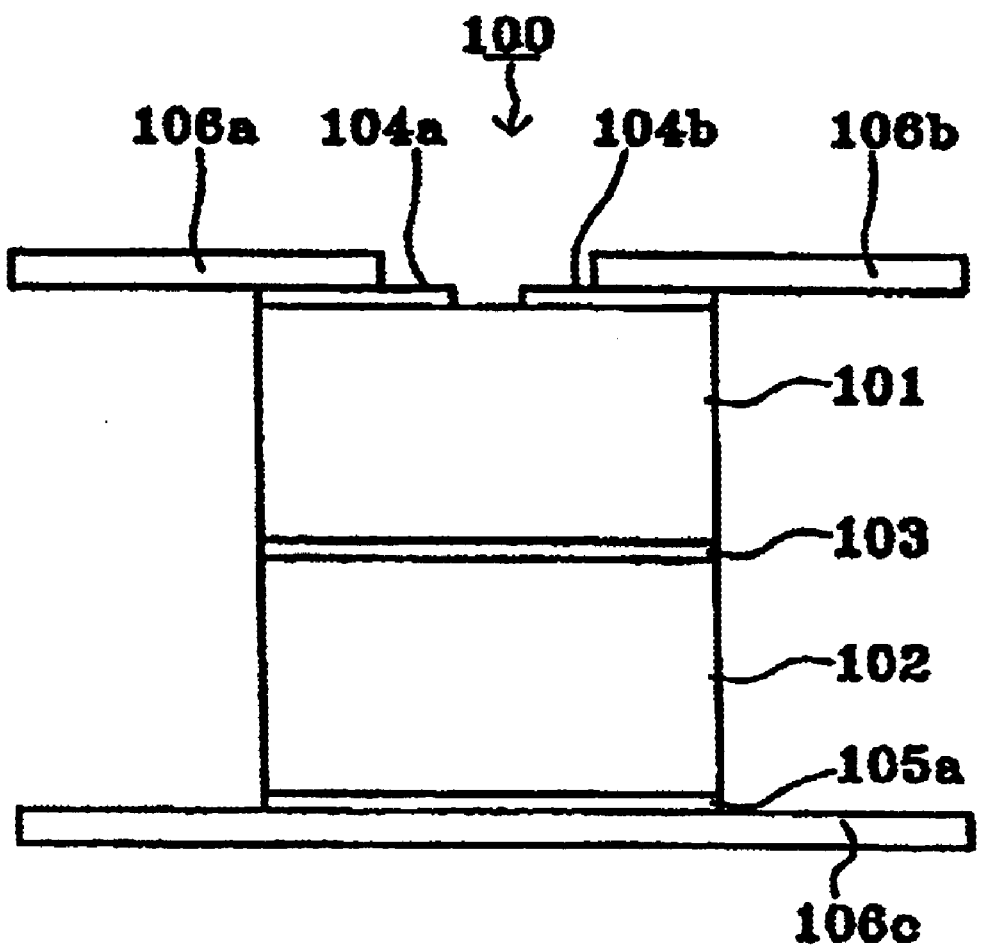
FIG. 21 is a front view of the vibrator for a vibrating gyroscope of FIG. 20.

FIG. 1 shows a perspective view of a vibrator 10 used for a vibrating gyroscope according to an embodiment of the present invention. FIG. 2 shows a front view thereof. Components in FIGS. 1 and 2 which are the same or similar components as those of the vibrator 100 shown in FIGS. 20 and 21 are given the same reference numerals. In FIGS. 1 and 2, the illustration of supporting members corresponding to the supporting members 106a, 106b, 106c, and 106d shown in the vibrator for a vibrating gyroscope 100 is omitted.

The vibrator 10, which preferably has a rectangular parallelpiped shape, comprises a first piezoelectric body 101, a second piezoelectric body 102. Each of the first and second piezoelectric bodies 101 and 102 has first and second main surface. The vibrator 10 further comprises an intermediate electrode 103, and the first and second piezoelectric bodies 101 and 102 interpose the intermediate electrode 103 such that the first main surfaces of the first and second piezoelectric bodies 101 and 102 are bonded to opposite sides of the intermediate electrode 103, respectively, thereby forming a vibrating body in the form of a rectangular solid.

A driving electrode 105a is provided on the second main surface of the second piezoelectric body 102. First and second detection electrodes 104a and 104b are provided on the second main surface of the first piezoelectric body such that they are spaced from each other in a longitudinal direction of the vibrating body.

As shown in FIGS. 1 and 2, the first piezoelectric body 101, which has a thickness a0, has a groove 107a. The groove 107a, which is provided along the longitudinal direction of the vibrator 10 between the first detection electrode 104a and the second detection electrode 104b has a depth of a1, is symmetrical with respect to the width direction of the first piezoelectric body 101, and has a bottom portion 107a' which is parallel to the first main surface of the first piezoelectric body 101.

In the vibrator 10, it is preferable that the groove 107a have a bottom portion 107a' which is parallel to one main surface of the first piezoelectric body 101. However, in practice, when vibrating gyroscopes are mass-produced, the groove is often inclined with respect to one main surface of the first piezoelectric body 101.

Figure 3:
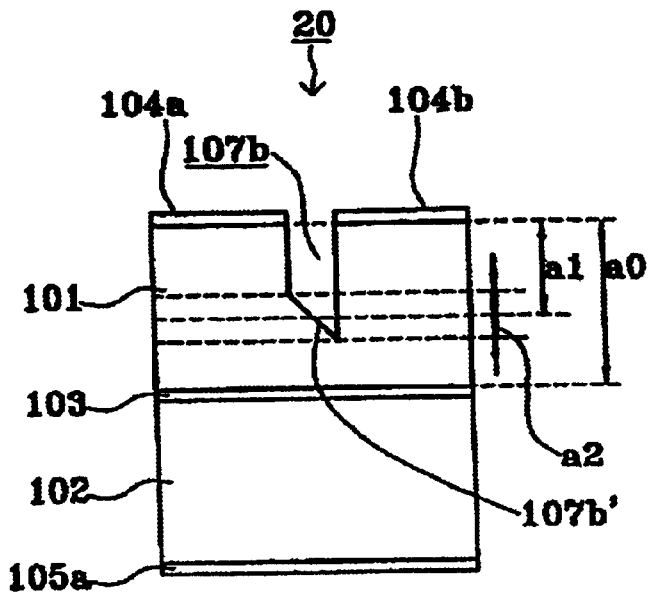
FIG. 3 is a front view showing another embodiment of a vibrator for a vibrating gyroscope of the present invention.
Figure 4:
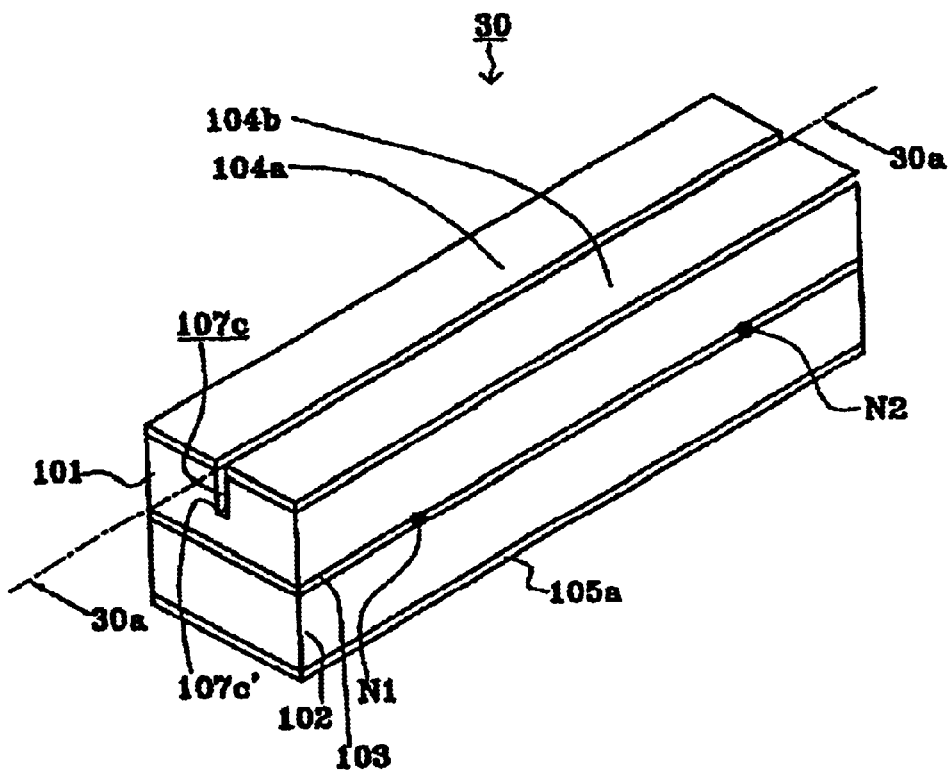
FIG. 4 is a perspective view showing yet another embodiment of a vibrator for a vibrating gyroscope of the present invention.
Figure 5:
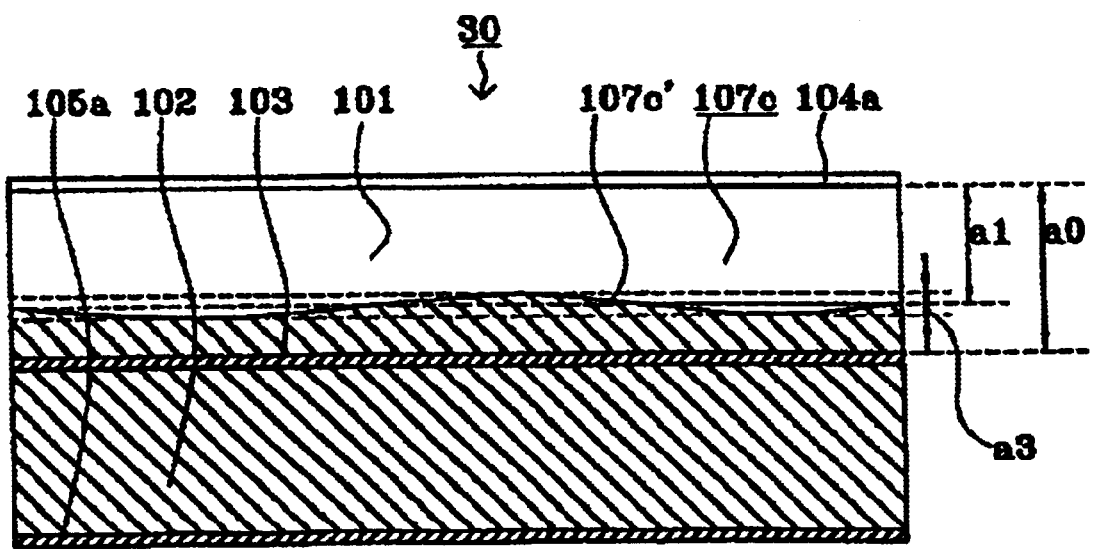
FIG. 5 is a sectional view along the line $30a$—$30a$ of the vibrator for a vibrating gyroscope of FIG. 4.

FIG. 3 shows a front view of another embodiment of a vibrator for a vibrating gyroscope of the present invention. FIG. 4 shows a perspective view of yet another embodiment of a vibrator for a vibrating gyroscope of the present invention. FIG. 5 shows a sectional view along the line 30a—30a thereof. Components in FIGS. 3, 4, and 5 which are the same or similar components as those of the vibrator 10 shown in FIG. 1 are given the same reference numerals, and descriptions thereof are omitted.

In FIG. 3, a vibrator 20 for a vibrating gyroscope of the present invention has a groove 107b instead of the groove 107a of the vibrator 10 shown in FIG. 1. The groove 107b, is on one main surface of the first piezoelectric body 101 and is provided along the longitudinal direction of the vibrator 20 between the first detection electrode 104a and the second detection electrode 104b. A bottom portion 107b' of the groove 107b has an inclination in the width direction of one main surface of the first piezoelectric body 101. For this reason, the groove 107b can be assumed to be a recessed groove having a depth of a1 and a margin of error of a2.

In FIGS. 4 and 5, a vibrator 30 for a vibrating gyroscope of the present invention has a groove 107c instead of the groove 107a of the vibrator 10 shown in FIG. 1. The groove 107c, is on one main surface of the first piezoelectric body 101 and is provided along the longitudinal direction of the vibrator 30 between the first detection electrode 104a and the second detection electrode 104b. A bottom portion 107c' of the groove 107c wobbles in the longitudinal direction of one main surface of the first piezoelectric body 101. For this reason, the groove 107c can be assumed to be a groove having a depth of a1 and a margin of error of a3.

Figure 6:
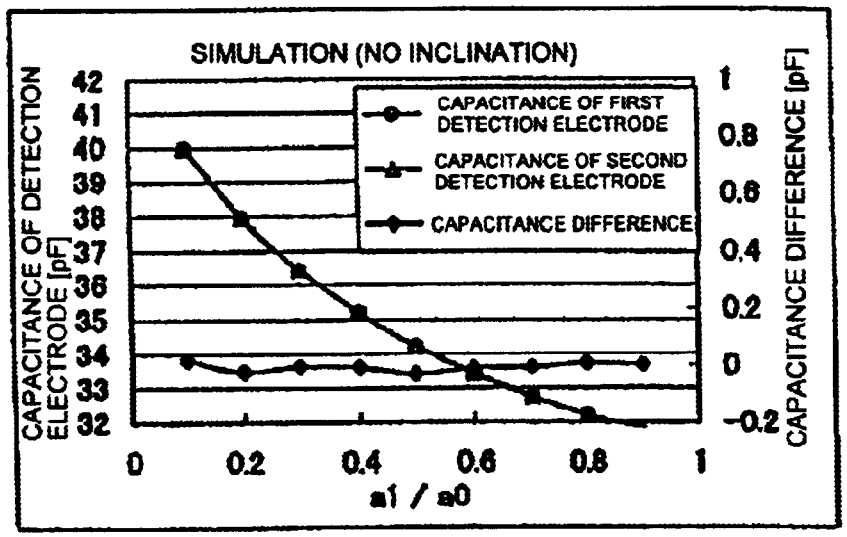
FIG. 6 is a characteristic view showing the capacitances of first and second detection electrodes, and changes in the capacitance difference with respect to $a1/a0$ (depth/thickness) of a vibrator for a vibrating gyroscope of the present invention.
Figure 7:
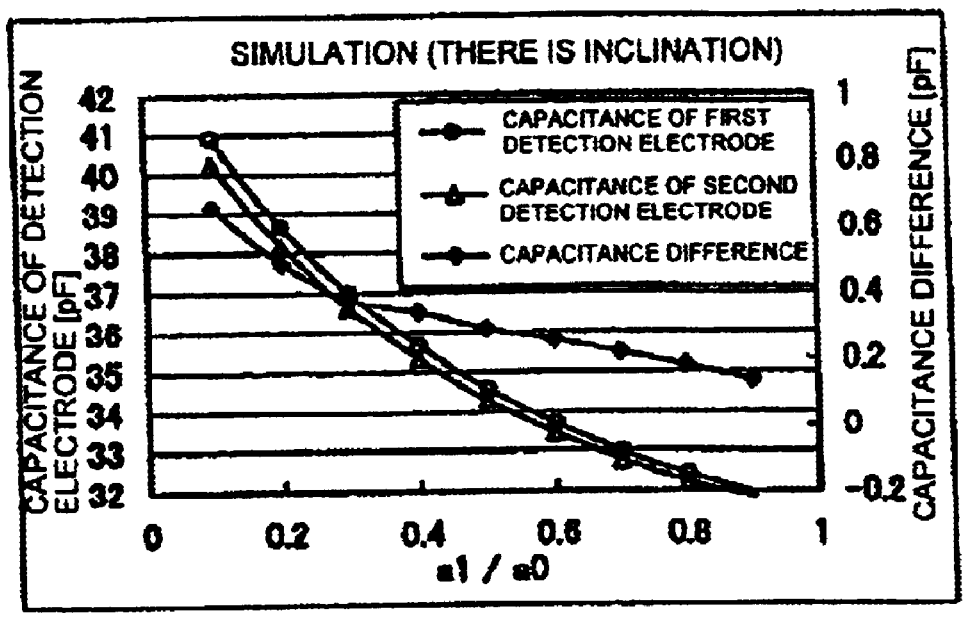
FIG. 7 is a characteristic view showing the capacitances of first and second detection electrodes, and changes in the capacitance difference with respect to $a1/a0$ of another vibrator for a vibrating gyroscope of the present invention.

FIG. 6 shows the capacitance of the first detection electrode 104a, the capacitance of the second detection electrode 104b, and simulation results of changes of the capacitance difference when a1/a0 of the vibrator 10 is changed. FIG. 7 shows the capacitance of the first detection electrode 104a, the capacitance of the second detection electrode 104b, and simulation results of changes of the capacitance difference when a1/a0 of the vibrator for a vibrating gyroscope 20 is changed. Here, the "capacitance of the first detection electrode" is a capacitance between the first detection electrode 104a and the driving electrode 105a. The "capacitance of the second detection electrode" is a capacitance between the second detection electrode 104b and the driving electrode 105a. The "capacitance difference" is a difference between the capacitance of the first detection electrode 104a and the capacitance of the second detection electrode 104b. a1/a0 of the horizontal axis indicates the ratio of the depth a1 of the grooves 107a and 107b to the thickness a0 of the first piezoelectric body 101.

As for the vibrator 10, in which the bottom portion 107a' of the groove is parallel to one main surface of the first piezoelectric body 101, the groove 107a is symmetrical with respect to the width direction of the first piezoelectric body 101, that is, the first detection electrode 104a side of the groove 107a and the second detection electrode 104b side of the groove 107a are formed in the same shape.

Therefore, as shown in FIG. 6, it can be seen that in the vibrator 10, even if a1/a0 is changed, the capacitance difference is almost zero.

In the vibrator 20, in which the groove 107b is not symmetrical with respect to the width direction of the first piezoelectric body 101, it can be seen as shown in FIG. 7 that, as a1/a0 increases the capacitance difference decreases.

Figure 8:
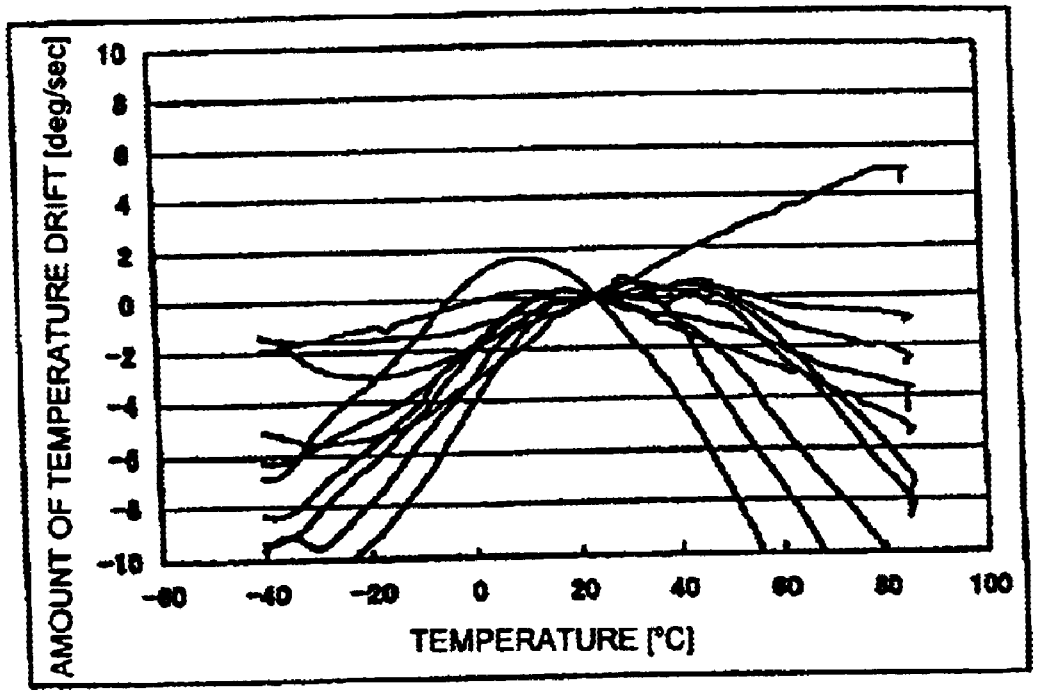
FIG. 8 is a characteristic view showing temperature drift of a vibrator for a vibrating gyroscope of the present invention.
Figure 9:
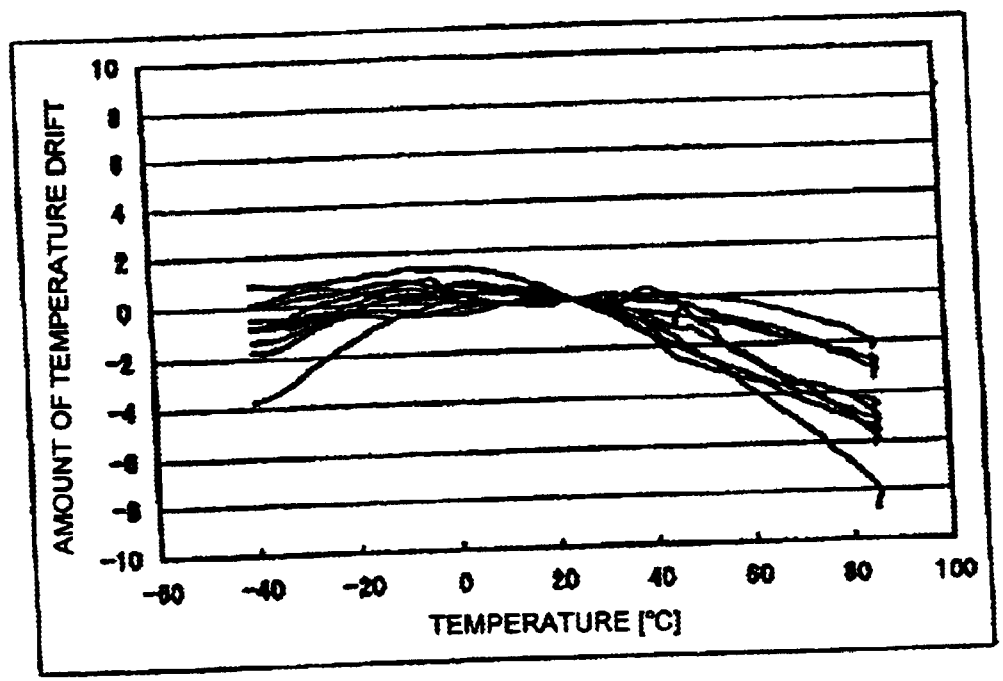
FIG. 9 is a characteristic view showing temperature drift of another vibrator for a vibrating gyroscope of the present invention.

Next, FIG. 8 shows the results of a temperature drift test when the capacitance difference was large. FIG. 9 shows the results of a temperature drift test when the capacitance difference was small. FIG. 8 shows the results of a temperature drift test when a1/a0 of the vibrator for a vibrating gyroscope 20 was set to 0.2, and FIG. 9 shows the results of a temperature drift test when a1/a0 of the vibrator for a vibrating gyroscope 20 was set to 0.6.

The "temperature drift test" shown in FIGS. 8 and 9 is a test in which a product is subjected to predetermined temperature changes and the stability of an output value of the product at that time is checked. The "temperature drift" of the vibrator is the stability of a measured angular velocity value which is output from the vibrating gyroscope. In a case where the vibrator is subjected to temperature changes, when the output angular velocity is a constant value, that is, is flat, it indicates that the vibrator is stable with respect to temperature changes. In contrast, when the output angular velocity varies, that is, is not flat in a case where temperature changes are given to the vibrator, it indicates that the vibrator is not stable with respect to temperature changes. As shown in FIGS. 8 and 9, it can be seen that, by decreasing the capacitance difference, the temperature drift becomes flat, and stability for temperature changes is improved.

Therefore, in the vibrator 10, since the capacitance difference is almost zero, the temperature drift becomes flat, and stability with respect to temperature changes is improved.

Also, in the vibrator 20, by performing a setting so that the capacitance difference becomes small, the temperature drift becomes flat, and stability with respect to temperature changes is improved.

Figure 10:
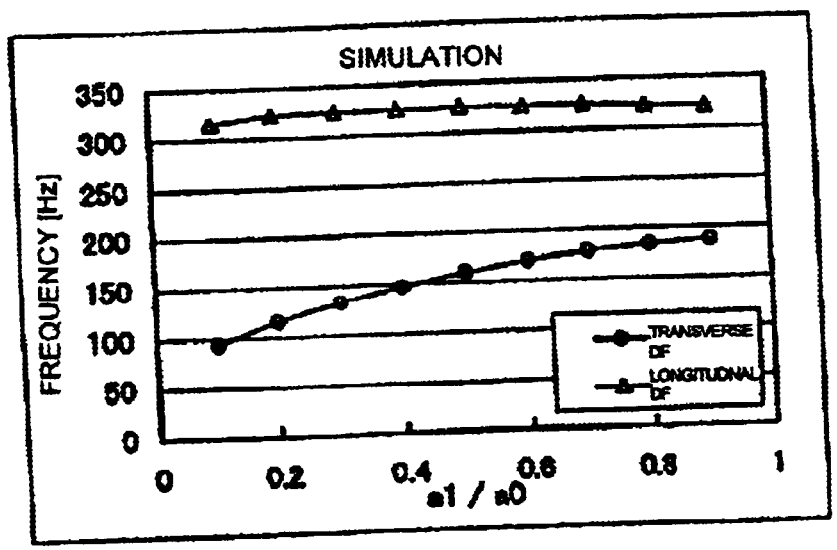
FIG. 10 is a characteristic view showing changes of transverse DF and longitudinal DF with respect to $a1/a0$ of a vibrator for a vibrating gyroscope of the present invention.
Figure 11:
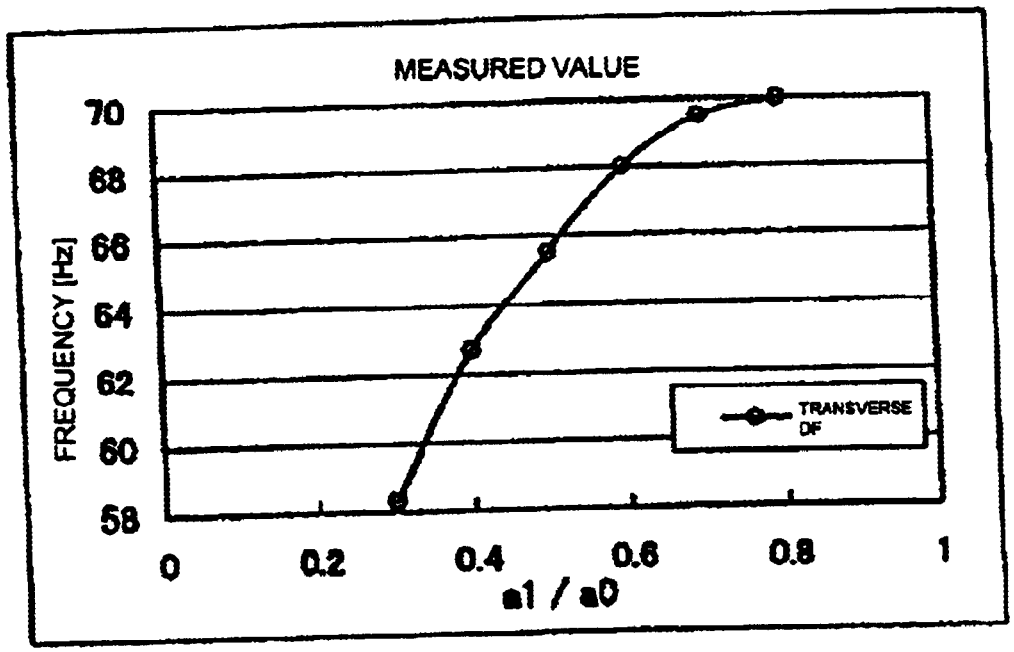
FIG. 11 is a characteristic view showing changes of transverse DF with respect to $a1/a0$ of a vibrator for a vibrating gyroscope of the present invention.

Next, FIG. 10 shows simulation results of changes in longitudinal DF and transverse DF when the depth of the groove 107b of the vibrator for a vibrating gyroscope 20 was changed. FIG. 11 shows the measured values. Here, the "longitudinal DF" is a difference between the resonance frequency and the anti-resonance frequency in longitudinal bending vibration, and the "transverse DF" is a difference between the resonance frequency and the anti-resonance frequency in transverse bending vibration.

It can be seen from the simulation results shown in FIG. 10 that a1/a0 hardly exerts any influence on the longitudinal DF and that the greater the ratio a1/a0, the larger the transverse DF.

It can also be seen from the measured values shown in FIG. 11 that, in a manner similar to the simulation results, the greater the ratio a1/a0, the larger the transverse DF.

In the vibrator for a vibrating gyroscope, if the longitudinal DF or the transverse DF is set to be large, vibration is stabilized. Furthermore, as a result of giving sharp temperature changes to the vibrator for a vibrating gyroscope, the polarization of the piezoelectric body becomes small, causing the longitudinal DF and the transverse DF of the piezoelectric body to change. Even in that case, if the longitudinal DF and the transverse DF have nearly the same value, the longitudinal DF and the transverse DF change while the ratio thereof is maintained at a constant, and variations in the angular-velocity detection sensitivity are not likely to occur.

In the vibrator 20, by setting a1/a0 to an appropriate magnitude, the transverse DF can be increased, thereby stabilizing the vibration. Furthermore, in the vibrator 20, since the longitudinal DF is nearly constant regardless of a1/a0, by setting a1/a0 to an appropriate magnitude, the transverse DF and the transverse DF can be brought closer to each other. As a result, even when sharp temperature changes occur, variations in the angular-velocity detection sensitivity can be reduced.

Figure 12:
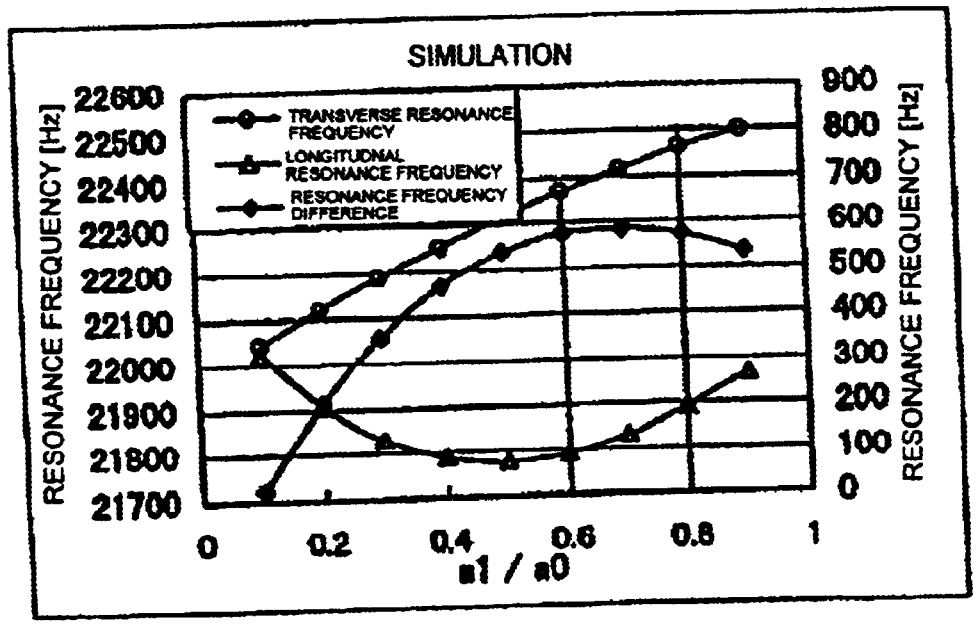
FIG. 12 is a characteristic view showing longitudinal and transverse resonance frequencies, and changes of the resonance frequency difference with respect to $a1/a0$ of a vibrator for a vibrating gyroscope of the present invention.

Next, FIG. 12 shows simulation results of the longitudinal resonance frequency, the transverse resonance frequency, and the changes of the resonance frequency difference when the ratio a1/a0 of the vibrator for a vibrating gyroscope 20 was changed. Here, the "longitudinal resonance frequency" and the "transverse resonance frequency" are resonance frequencies in the longitudinal bending vibration and the transverse bending vibration of a vibrator for a vibrating gyroscope, respectively. The "resonance frequency difference" is the difference between the longitudinal resonance frequency and the transverse resonance frequency. The resonance frequency difference is a characteristic which exerts an influence on the sensitivity of the vibrator for a vibrating gyroscope. If the resonance frequency difference is a constant value for each vibrator for a vibrating gyroscope, variations in the sensitivity of the vibrator for a vibrating gyroscope do not occur, and if the resonance frequency difference is not a constant value, variations in the sensitivity thereof occur. It can be seen from the simulation results of FIG. 12 that when a1/a0 is 0.6 to 0.8, the resonance frequency difference is nearly a constant value regardless of the depth of the groove. Therefore, for the vibrator for a vibrating gyroscopes 20 and 30 of the present invention, by setting a1/a0 to 0.6 to 0.8, it is possible to cause the resonance frequency difference to be nearly a constant value even when there are variations in the depth of the groove, such as an inclination with respect to one main surface of the first piezoelectric body 101 in the bottom portions 107b' and 107c' of the groove.

Figure 13:
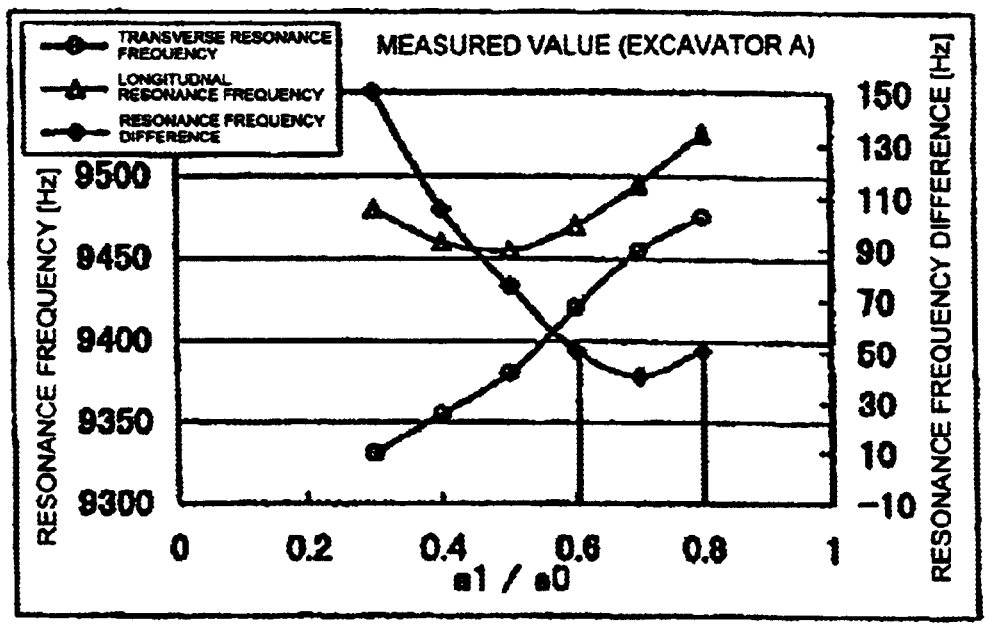
FIG. 13 is a characteristic view showing longitudinal and transverse resonance frequencies, and changes of the resonance frequency difference with respect to $a1/a0$ of a vibrator for a vibrating gyroscope of the present invention.
Figure 14:
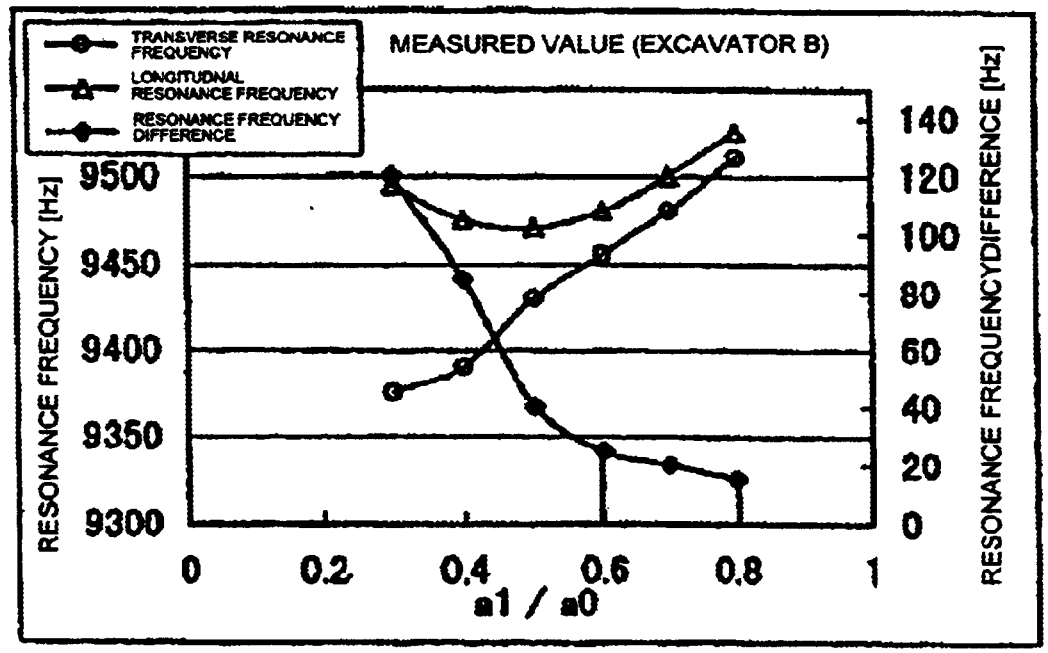
FIG. 14 is another characteristic view showing longitudinal and transverse resonance frequencies, and changes of the resonance frequency difference with respect to $a1/a0$ of a vibrator for a vibrating gyroscope of the present invention.

FIGS. 13 and 14 show the longitudinal resonance frequency, the transverse resonance frequency, and the measured values of the changes in the resonance frequency difference when a groove was formed using excavators A and B which formed recessed grooves in which there were different inclinations of the bottom portion of each groove. It can be seen from FIGS. 13 and 14 that the resonance frequency difference is nearly a constant value in the range in which a1/a0 is from 0.6 to 0.8 regardless of the inclination of the bottom portion of the groove.

In the vibrators 20 and 30, even when there is an inclination in the bottom portions 107b' and 107c' of the grooves, it is possible to cause the resonance frequency difference to be nearly a constant value by setting a1/a0 in the range of 0.6 to 0.8, thereby allowing variations in the angular-velocity detection sensitivity to be reduced.

As for the grooves 107a, 107b, and 107c provided in the vibrators 10, 20 and 30, respectively, preferably, the grooves are not very shallow grooves such as scratches which are made accidentally when the first detection electrode 104a and the second detection electrode 104b are formed, and a1/a0 is more than or equal to 0.1. Needless to say, when the specific dimensions and shape of the vibrator for a vibrating gyroscope change, the simulation results and the specific values of the measured values, shown in the embodiment of the present invention, change.

Next, FIGS. 15A, 15B, 16A, 16B, 17A, and 17B show a front view of yet another embodiment of a vibrator for a vibrating gyroscope of the present invention. Components in FIGS. 15A to 17B which are the same or similar components as those of the vibrator 10 shown in FIGS. 1 and 2 are given the same reference numerals, and descriptions thereof are omitted.

Figure 15A:
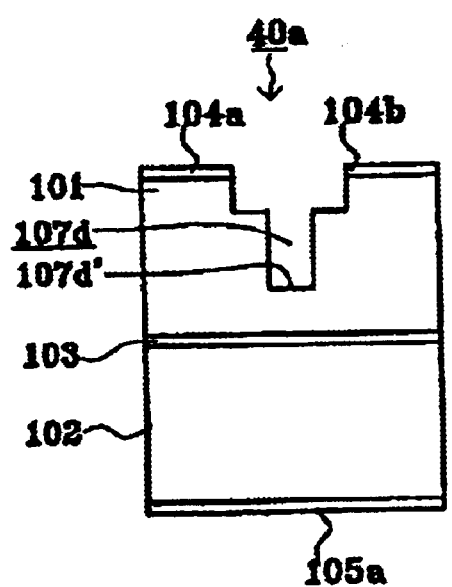
FIGS. 15A and 15B are front views showing yet another embodiment of a vibrator for a vibrating gyroscope of the present invention.

In FIG. 15A, a vibrator 40a has a groove 107d instead of the groove 107a of the vibrator 10 shown in FIG. 1. The groove 107d is a recessed, stepped groove provided on one main surface of the first piezoelectric body 101 along the longitudinal direction of the vibrator 40c.

Figure 15B:
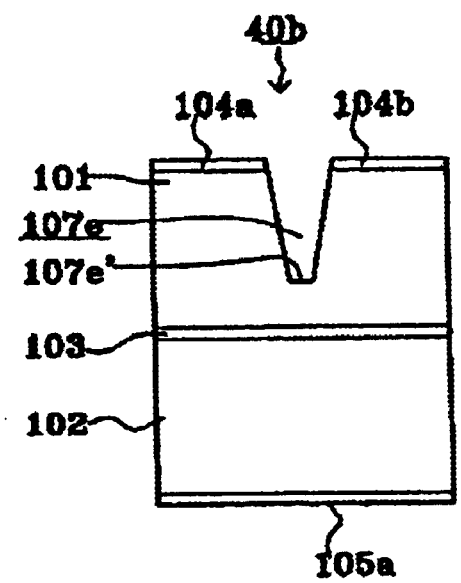

In FIG. 15B, a vibrator 40b has a groove 107e instead of the groove 107a of the vibrator 10 shown in FIG. 1. The groove 107e is a recessed, tapered groove provided on one main surface of the first piezoelectric body 101 along the longitudinal direction of the vibrator for a vibrating gyroscope 40b.

The vibrators 40a and 40b can achieve the same advantages as those of the vibrators 10, 20, and 30.

Figure 16A:
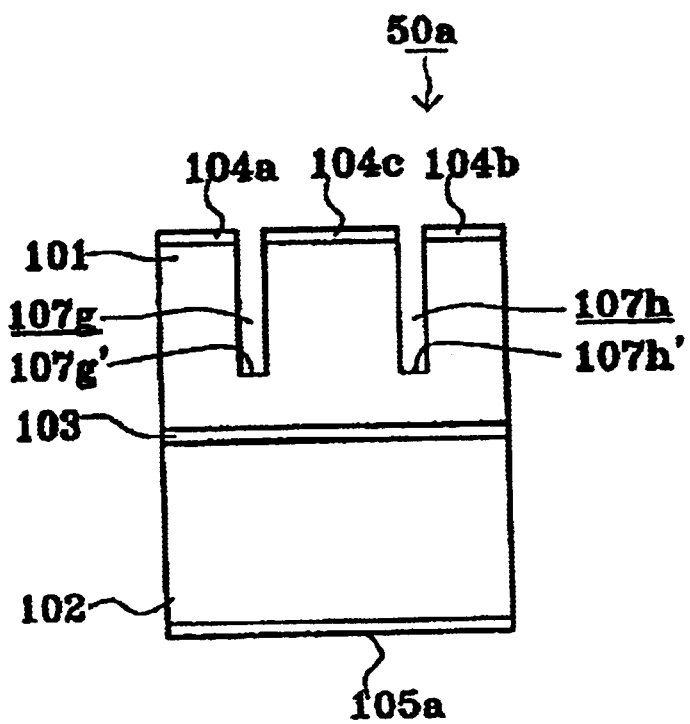
FIGS. 16A and 16B are front views showing yet another embodiment of a vibrator for a vibrating gyroscope of the present invention.

In FIG. 16A, a vibrator 50a has a groove 107g and a groove 107h instead of the groove 107a of the vibrator 10 shown in FIG. 1. The groove 107g and the groove 107h are formed in such away that the distance from one longitudinal side surface of the first piezoelectric body 101 to the groove 107g is equal to the distance from the other side surface thereof to the groove 107h. A supporting member (not shown), etc., is connected to an electrode 104c provided between the groove 107g and the groove 107h.

Figure 16B:
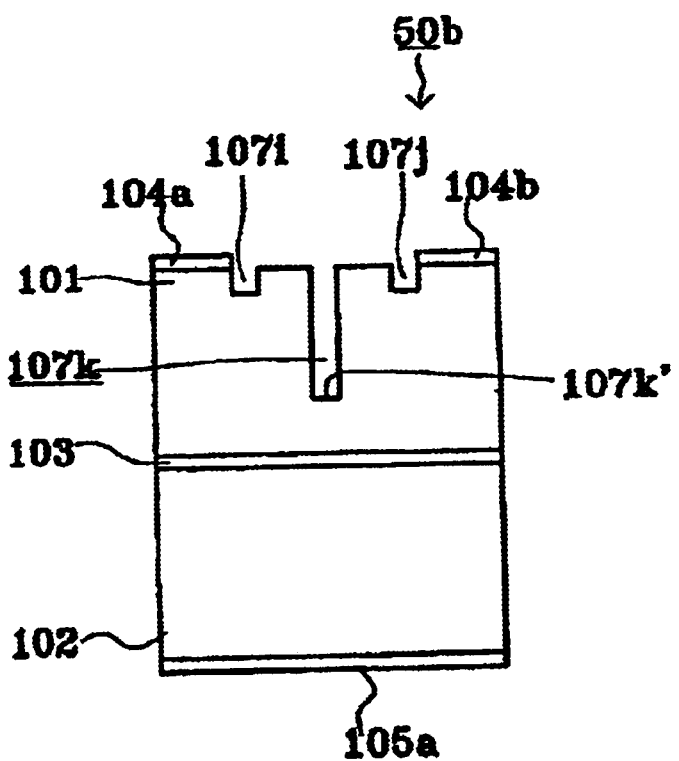

In FIG. 16B, a vibrator 50b of the present invention has a groove 107i and a groove 107j instead of the groove 107a of the vibrator 10 shown in FIG. 1. The groove 107i and the groove 107j are formed in such a way that the distance from one longitudinal side surface of the first piezoelectric body 101 to the groove 107i is equal to the distance from the other side surface thereof to the groove 107j. Furthermore, a groove 107k is provided between the groove 107i and the groove 107j.

The vibrators 50a and 50b can also achieve the same advantages as those of the vibrators 10, 20, and 30. The electrode 104c may be omitted if it is not necessary.

Figure 17A:
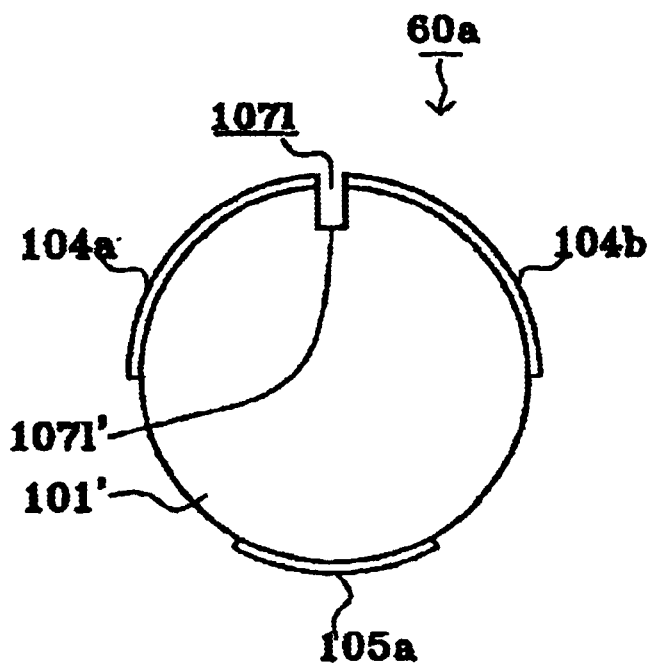
FIGS. 17A and 17B are front views showing yet another embodiment of a vibrator for a vibrating gyroscope of the present invention.

In FIG. 17A, a vibrator 60a of the present invention has a cylindrical piezoelectric body 101', a first detection electrode 104a, a second detection electrode 104b, a driving electrode 105a, and a groove 1071. The groove 1071 is formed between the first detection electrode 104a and the second detection electrode 104b along the longitudinal direction of the piezoelectric body 101'.

Figure 17B:
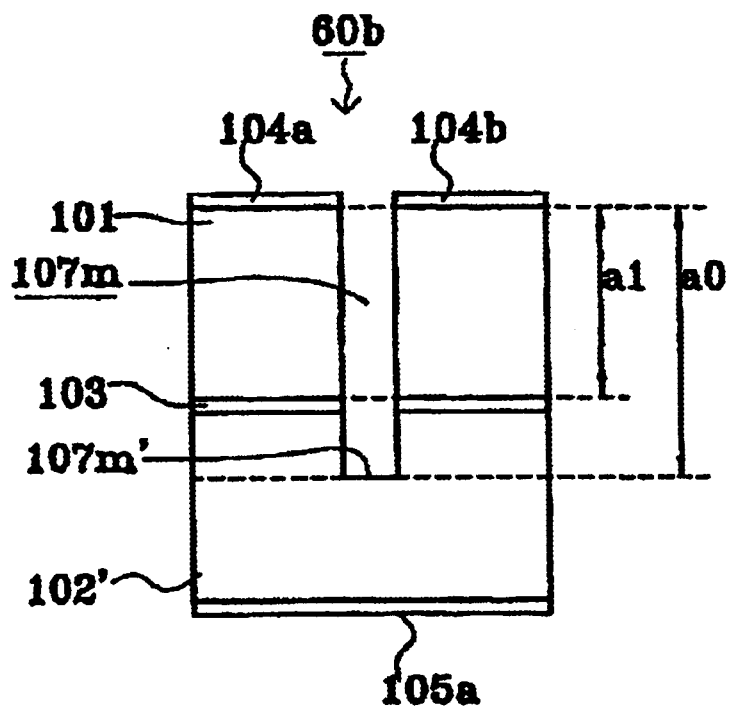

In FIG. 17B, a vibrator 60b of the present invention has a first piezoelectric body 101, a silicon plate 102', a first detection electrode 104a, a second detection electrode 104b, an intermediate electrode 103, a driving electrode 105a, and a groove 107m. The groove 107m is a recessed groove provided on one main surface of the first piezoelectric body 101 along the vibrator for a vibrating gyroscope 60b, the a bottom portion 107m' of which extends to the silicon plate 102'.

The vibrators 60a and 60b of the present invention can achieve the same advantages as those of the vibrators 10, 20, and 30. Needless to say, if a metallic plate is used in place of the silicon plate 102', the same advantages can be achieved. Furthermore, as a result of extending, using a lead wire, etc., the intermediate electrode 103 provided on the other main surface of the first piezoelectric body 101, even if an insulating material such as a ferrite plate is used instead of the silicon plate 102', the same advantages can be achieved.

Figure 18:
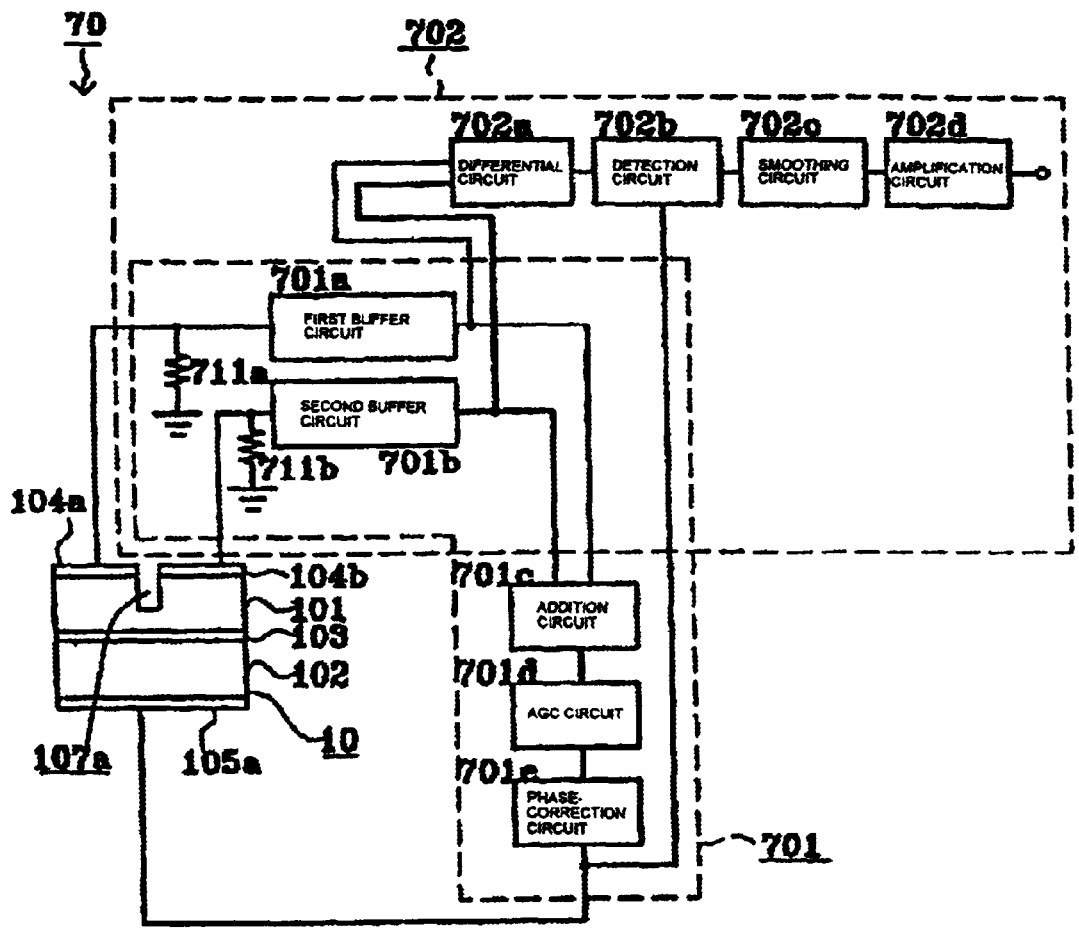
FIG. 18 is a block diagram showing an embodiment of a vibrating gyroscope of the present invention.

Next, FIG. 18 shows a block diagram of an embodiment of a vibrating gyroscope using a vibrator of the present invention.

In FIG. 18, a vibrating gyroscope 70 of the present invention has the vibrator 10 shown in FIG. 1, an oscillation circuit 701 which is a driving means, and a detection circuit 702 which is a detection means. The oscillation circuit 701 has a first buffer circuit 701a, a second buffer circuit 701b, resistors 711a and 711b, an addition circuit 701c, an AGC (Automatic Gain Control) circuit 701d, and a phase-correction circuit 701e. The detection circuit 702 has a first buffer circuit 701a, a second buffer circuit 701b, resistors 711a and 711b, a differential circuit 702a, a detection circuit 702b, a smoothing circuit 702c, and an amplification circuit 702d.

Here, the resistor 711a and the first buffer circuit 701a are connected to the first detection electrode 104a, and the resistor 711b and the second buffer circuit 701b are connected to the second detection electrode 104b. Furthermore, the first buffer circuit 701a and the second buffer circuit 701b are connected to the addition circuit 701c and the differential circuit 702a, respectively. The addition circuit 701c is connected to the AGC circuit 701d, the AGC circuit 701d is connected to the phase-correction circuit 701e, and the phase-correction circuit 701e is connected to the detection circuit 702b and the driving electrode 105a. Furthermore, the differential circuit 702a is connected to the detection circuit 702b, the detection circuit 702b is connected to the smoothing circuit 702c, and the smoothing circuit 702c is connected to the amplification circuit 702d.

In the vibrating gyroscope 70 of the present invention, which is constructed in this manner, the first buffer circuit 701a is used to output the voltage of the first detection electrode 104a to the addition circuit 701c and the differential circuit 702a. The second buffer circuit 701b is used to output the voltage of the second detection electrode 104b to the addition circuit 701c and the differential circuit 702a. The resistors 711a and 711b are used to adjust the impedance of the first detection electrode 104a and the second detection electrode 104b, respectively. The addition circuit 701c adds together the input signals and outputs them to the AGC circuit 701d. The AGC circuit 701d performs amplification so that the amplitude of the input signal becomes constant and it is then output to the phase-correction circuit 701e. The phase-correction circuit 701e corrects the phase of the input signal and applies a driving signal to the driving electrode 105a.

On the other hand, the differential circuit 702a subtracts the input signal and outputs it to the detection circuit 702b. The detection circuit 702b detects the signal which is input from the differential circuit 702a by a signal input from the phase-correction circuit 701e, and outputs it to the smoothing circuit 702c. The smoothing circuit 702c smoothes the input signal and outputs it to the amplification circuit 702d. The amplification circuit 702d performs DC amplification on the input signal so that the sensitivity of the angular velocity to be output becomes constant and it is output externally.

In the vibrating gyroscope 70 having such a construction of the present invention, as a result of providing a recessed groove 107a having a predetermined depth, the resonance frequency difference becomes nearly a constant value, and the variations of the sensitivity of the signals output from the first detection electrode 104a and the second detection electrode 104b are reduced. Therefore, since the detection circuit 702 can be formed using the amplification circuit 702d having a small amplification ratio, the cost can be reduced.

Figure 19:
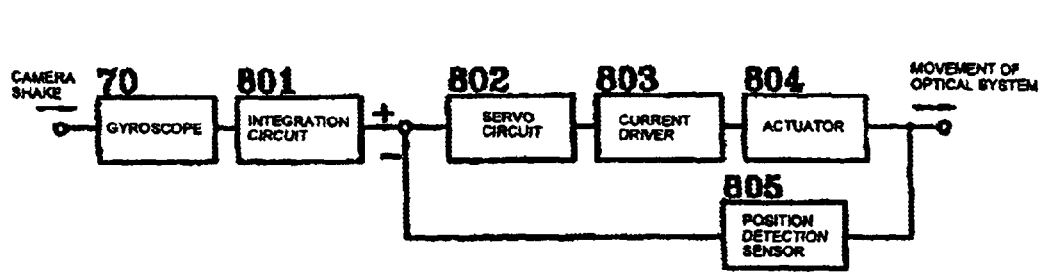
FIG. 19 is a block diagram showing an embodiment of a camera-shake prevention circuit for use in an electronic apparatus of the present invention.

Next, FIG. 19 shows an embodiment of an electronic apparatus using a vibrating gyroscope of the present invention. FIG. 19 is a block diagram showing an embodiment of a camera-shake prevention circuit for use in a video camera which is an electronic apparatus of the present invention. A camera-shake prevention circuit 80 has the vibrating gyroscope 70 of the present invention, an integration circuit 801, a servo circuit 802, a current driver 803, an actuator 804, and a position detection sensor 805. In the camera-shake prevention circuit 80, the vibrating gyroscope 70, the integration circuit 801, the servo circuit 802, the current driver 803, and the actuator 804 are connected in series, and the output of the actuator 804 is fed back to the servo circuit 802 via the position detection sensor 805.

In the camera-shake prevention circuit 80 constructed as described above, only the angular velocity signal within the camera shake given to the video camera is input from the vibrating gyroscope 70 to the integration circuit 801. The integration circuit 801 integrates the angular velocity signal, converts it into a deflection angle of the video camera, and outputs it to the servo circuit 802. The servo circuit 802 computes the difference between the current value and the target value by using the signal of the deflection angle input from the integration circuit 801 and the position detection sensor 805, and outputs it to the current driver 803. The current driver 803 outputs a current corresponding to the input signal to the actuator 804. The actuator 804 mechanically drives the optical system of the video camera. Then, the position detection sensor 805 outputs the deflection angle caused by the driving of the optical system, to the servo circuit 802.

A video camera, which is an electronic apparatus of the present invention having such a construction, uses a vibrating gyroscope capable of accurately detecting angular velocity with high sensitivity, thus making it possible to precisely eliminate the influence of the camera shake.

In the foregoing, although the embodiment of the electronic apparatus of the present invention has been described using a video camera, the electronic apparatus of the present invention is not limited to the video camera of the construction described in the embodiment.

In the vibrator for a vibrating gyroscope of the present invention, since a groove is provided between a first detection electrode and a second detection electrode, the transverse DF is increased, and vibration is stabilized.

In the vibrator for a vibrating gyroscope of the present invention, longitudinal DF is constant, and as a result of providing a groove, the transverse DF is increased, causing the longitudinal DF and the transverse DF to draw closer to each other. Therefore, even when sharp temperature changes are given, variations in the angular-velocity detection sensitivity are not likely to occur.

In the vibrator for a vibrating gyroscope of the present invention, since a groove is provided between a first detection electrode and a second detection electrode, the capacitance difference is small, and superior temperature stability is provided.

In the vibrator for a vibrating gyroscope of the present invention, since a groove provided between a first detection electrode and a second detection electrode is symmetrical with respect to the width direction of a first piezoelectric body, the capacitance difference is very small, and superior temperature stability is provided.

In the vibrator for a vibrating gyroscope of the present invention, since the depth of a groove is a predetermined depth, even if a groove provided between a first detection electrode and a second detection electrode is not symmetrical with respect to the width direction of a first piezoelectric body, the resonance frequency difference becomes nearly a constant value, and variations in the angular-velocity detection sensitivity are not likely to occur.

Since the vibrating gyroscope of the present invention uses a vibrator for a vibrating gyroscope in which variations in the angular-velocity detection sensitivity are not likely to occur, a detection circuit can be formed using an amplification circuit having a small amplification ratio, thereby reducing cost.

The vibrating gyroscope of the present invention uses a vibrator for a vibrating gyroscope in which vibration is stable and variations in the angular-velocity detection sensitivity are not likely to occur. Thus, it is possible to accurately detect angular velocity.

The electronic apparatus of the present invention uses a vibrator for a vibrating gyroscope which has superior temperature stability and which is capable of accurately detecting angular velocity. Thus, it is possible to construct a precise control mechanism.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A vibrator for a vibrating gyroscope comprising:
   a piezoelectric vibratable body having a first main surface, a second main surface a pair of opposed side surfaces, and a pair of opposed end surfaces extending between the first and second main surfaces; and
   a first detection electrode and a second detection electrode formed on the first main surface of the piezoelectric body for outputting a signal containing an angular velocity;
   wherein at least one groove having a predetermined depth is provided in the first main surface of the piezoelectric body between the first detection electrode and the second detection electrode so as to separate the first detection electrode and the second detection electrode on the first major surface of the piezoelectric body.

2. A vibrator for a vibrating gyroscope according to claim 1, wherein the piezoelectric vibratable body comprises:
   an intermediate electrode;
   first and second piezoelectric bodies, each having first and second main surface, the first and second piezoelectric bodies being laminated via the intermediate electrode such that the first main surfaces of the first and second piezoelectric bodies are bonded to opposite sides of the intermediate electrode, respectively; and
   a driving electrode provided on the second main surface of the second piezoelectric body, wherein the first and second detection electrodes are provided on the second main surface of the first piezoelectric body, wherein the at least one groove is provided on the second main surface of the first piezoelectric body along a longitudinal center line of the second main surface of the first piezoelectric body.

3. A vibrator for a vibrating gyroscope according to claim 2, wherein the at least one groove is symmetrical with respect to the width direction of the first piezoelectric body.

4. A vibrator for a vibrating gyroscope according to any one of claims 2 and 3, wherein the bottom portion of the at least one groove is parallel to the second main surface of the first prezoelectric body.

5. A vibrator for a vibrating gyroscope according to any one of claims 2 to 3, wherein the depth of the at least one groove is more than or equal to 10% of the thickness of the first piezoelectric body.

6. A vibrator for a vibrating gyroscope according to claim 4, wherein the depth of the at least one groove is more than or equal to 10% of the thickness of the first piezoelectric body.

7. A vibrator for a vibrating gyroscope according to one of claims 2 to 3, wherein the depth of the at least one groove is 60% to 80% of the thickness of the first piezoelectric body.

8. A vibrator for a vibrating gyroscope according to claim 4, wherein the depth of the at least one groove is 60% to 80% of the thickness of the first piezoelectric body.

9. A vibrator for a vibrating gyroscope according to claim 5, wherein the depth of the at least one groove is 60% to 80% of the thickness of the first piezoelectric body.

10. A vibrator for a vibrating gyroscope according to claim 9, wherein the bottom portion of the at least one groove is parallel to the second main surface of the first piezoelectric body.

11. A vibrating gyroscope comprising:
    a vibrator for a vibrating gyroscope according to any one of claims 2 or 3;
    driving means for driving the vibrator for a vibrating gyroscope; and
    detection means for detecting an output generated from the vibrator for a vibrating gyroscope.

12. A vibrating gyroscope comprising:
    a vibrator for a vibrating gyroscope according to claim 4;
    driving means for driving the vibrator for a vibrating gyroscope; and detection means for detecting an output generated from the vibrator for a vibrating gyroscope.

13. A vibrating gyroscope comprising:

a vibrator for a vibrating gyroscope according to claim 6;

driving means for driving the vibrator for a vibrating gyroscope; and detection means for detecting an output generated from the vibrator for a vibrating gyroscope.

14. A vibrating gyroscope comprising:

a vibrator for a vibrating gyroscope according to claim 9;

driving means for driving the vibrator for a vibrating gyroscope; and detection means for detecting an output generated from the vibrator for a vibrating gyroscope.

15. A vibrating gyroscope comprising:

a vibrator for a vibrating gyroscope according to claim 10;

driving means for driving the vibrator for a vibrating gyroscope; and detection means for detecting an output generated from the vibrator for a vibrating gyroscope.

16. An electronic apparatus having a vibrating gyroscope according to claim 11.

17. An electronic apparatus having a vibrating gyroscope according to claim 12.

18. An electronic apparatus having a vibrating gyroscope according to claim 13.

19. An electronic apparatus having a vibrating gyroscope according to claim 14.

20. An electronic apparatus having a vibrating gyroscope according to claim 15.

21. A vibrator for a vibrating gyroscope according to claim 1, wherein the at least one groove has opposing side walls which are stepped.

22. A vibrator for a vibrating gyroscope according to claim 1, wherein the groove has opposing side walls which are inclined with respect to a bottom portion of the groove.

23. A vibrator for a vibrating gyroscope according to claim 1, having first and second grooves provided in the piezoelectric vibrating body between the first detection electrode and the second detection electrode, each of the first and second grooves having respective predetermined depths.

24. A vibrator for a vibrating gyroscope according to claim 23, wherein the first groove is formed parallel to a first sidewall of the vibratable body at a predetermined distance from said side wall and the second groove is formed parallel to an opposite sidewall of the vibratable body at the same predetermined distance.

25. A vibrator for a vibrating gyroscope according to claim 1, having first, second and third grooves provided in the piezoelectric vibrating body between the first detection electrode and the second detection electrode, with the third groove being intermediate to the first and second grooves, each of the grooves having respective predetermined depths, with the first and second grooves having the same predetermined depth.

26. A vibrator for a vibrating gyroscope according to claim 1, wherein the piezoelectric vibratable body has a rectangular parallelpiped shape.

27. A vibrator for a vibrating gyroscope according to claim 2, wherein a bottom portion of the at least one groove is located in the second piezoelectric body.

28. A vibrator for a vibrating gyroscope according to claim 27, wherein the bottom portion includes a plate made of steel, silicon or a ferrite.

* * * * *